Aug. 7, 1962 — R. L. TIEDE — 3,048,466
TREATMENT FOR GLASS BODIES IN FILAMENT FORMING OPERATION
Original Filed Dec. 22, 1958 — 3 Sheets-Sheet 1

INVENTOR.
RALPH L. TIEDE
BY
ATTORNEYS

INVENTOR.
RALPH L. TIEDE

Aug. 7, 1962   R. L. TIEDE   3,048,466
TREATMENT FOR GLASS BODIES IN FILAMENT FORMING OPERATION
Original Filed Dec. 22, 1958   3 Sheets-Sheet 3

INVENTOR.
RALPH L. TIEDE
BY
ATTORNEYS 3,048,466
TREATMENT FOR GLASS BODIES IN FILAMENT FORMING OPERATION
Ralph L. Tiede, Newark, Ohio, assignor to Owens-Corning Fiberglas Corporation, a corporation of Delaware
Continuation of application Ser. No. 782,171, Dec. 22, 1958. This application Dec. 7, 1960, Ser. No. 74,430
10 Claims. (Cl. 18—54)

This invention relates to a treatment for glass bodies, and more particularly to a treatment for glass marbles which facilitates their subsequent melting, e.g., in a bushing to provide a body of molten glass from which filaments can be drawn. The present application is a continuation of the applicant's co-pending application, Serial Number 782,171, which was filed December 22, 1958, and is now abandoned.

One common method of producing continuous glass filaments comprises melting glass marbles in an electrically heated, platinum bushing, flowing streams of the glass through orifices in the bushing, and attenuating filaments from the streams of molten glass. The filaments can then be led across an applicator which coats them with a suitable binder and collected into a strand by a gathering shoe. In some instances the applicator and the shoe have been combined in one unit. The strand subsequently can be wound on a rotating forming tube mounted on a motor driven collet to produce a "package" of strand on the tube.

The bushing orifices are small in size, e.g., 0.060″ in diameter, and the fibers which are ultimately produced from the molten glass are much smaller, e.g., from 0.00030 to 0.00050″ in diameter. It will be readily understood that solid particles or bubbles, generally known in the art as stones and seeds, in the molten glass will occasionally plug such small orifices or, more frequently extend completely through the filaments. In the former case, the filament forming stream is interrupted, and in the latter the filament may be pulled apart; either such occurrence interrupts the operation. Such an interruption is known in the art as a breakout. The stones in the glass can be foreign particles, or foreign particles associated with crystals formed from constituents of the glass. Foreign particles in a glass melt act as nucleating points on which crystals readily grow if the temperature of the glass is not above or below the devitrification range. Seeds and stones in the molten glass can be decreased by any of several expedients, e.g., by changing the temperature of the glass in the bushing, by maintaining the glass at a given temperature for a longer period of time, by screening the molten glass, or by stirring the glass in the bushing, any of which expedients tends to reduce the formation of stones and seeds and/or to dissolve or eliminate those present. These expedients, however, are not completely effective in avoiding interruptions in a commercial fiber forming operation. In addition, the temperature to which the bushing is heated is limited to the maximum temperature which the platinum, or other material of which the bushing is made, can withstand. The time during which the glass is maintained at a high temperature is principally limited by the size of the bushing. Although this time can be increased by increasing the volume of the bushing, so that any portion of the molten glass therein will take longer to flow therethrough, an increase in size requires the use of considerably more platinum and additional floor space for the operation. Stirring or screening the glass in the bushing requires additional equipment, at least part of which must be made of highly refractory and expensive metal.

After fibers have been formed, coated, and gathered into a strand, as briefly stated above, the strand is wound on the forming tube for a given length of time, such as 15 minutes, and at the end of this time, a "package" of strand on the tube is removed from the collet and replaced by an empty tube. This operation is known in the art as a "calldown," referring to the completion of one full package of strand. If a filament should break out during the 15 minute period, no calldown occurs, and the partially completed strand package must be replaced by an empty forming tube and the operation restarted. In one situation using a glass of a given composition and a standard 150's bushing,[1] a calldown rate of only 20% was achieved in an eight hour period of operation. This figure means that five packages were started for every full 15 minute package that was obtained.

The present invention is based on the discovery that breakouts can be reduced substantially and that a greatly increased bushing performance can be obtained, by applying a thin coating of any of several specific materials to the surfaces of the marbles before they are supplied to a bushing. Although several theories have been proposed concerning the effect of the coating on the operation, it is not absolutely certain why the improved operation results; however, the effectiveness of such coatings is undisputable. For example, for the above discussed operation in which the calldown rate was only 20%, an increase to 84%, in a 7½ hour period of operation, occurred when marbles of the same glass composition but coated with a solution of boric acid, were used in the same bushing, with all other conditions remaining the same.

One observable effect of the successful coatings on the marbles is a reduced number of seeds at the marble surfaces or at interfaces between marbles after a standard melting test. This test involved heating about seven marbles, either uncoated or carrying a given coating, in a clay crucible for a constant period of time and at a temperature from 1900° to 2600° F., inclusive, at intervals of 100° F. The crucibles were then cooled, cut in two, polished, and subsequently observed with back lighting. The coatings which improved bushing operations greatly reduced the number of seeds compared to the number present when uncoated marbles and marbles with unsuccessful coatings were used. The marbles with unsuccessful coatings had as many or more seeds than uncoated ones, particularly within certain temperature ranges.

The successful coating compositions, as determined by this test or by actual bushing operation, were found to be boric acid, borax, sodium fluoride, sodium silico fluoride, phenol formaldehyde partial condensation products, particularly aqueous dispersions of resoles, and ammonium acetate. Of these, boric acid is the most desirable. Sodium fluoride, sodium silico fluoride, and phenol formaldehyde give off noxious fumes and are commercially practical only where there is extensive exhaust equipment. Borax is less desirable than boric acid because it adds additional soda, which is preferably kept as low as is possible, to the glass. It may be noted that all of the successful coatings except ammonium acetate act as fluxes. While phenol formaldehyde is not normally thought of as a flux, it actually contains a flux when sodium hydroxide is used as a condensation catalyst, and hydrochloric acid, for example, is employed for neutralization. It has also been observed that all of the successful coatings caused an increase in the water content of the glass as indicated by an absorption peak, upon infra red spectral analysis, at a wave length indicating hydroxyl groups.

A number of compositions were tested but found to have no beneficial effect or, in some cases, a detrimental effect. These were: hydrochloric acid, soda ash, sodium hydroxide, sodium silicate, a polishing solution of hydrofluoric and nitric acids, sodium sulphate, iron oxide, sili- ---
[1] A standard 150's bushing is one from which strand produced is of such a size that 15,000 yards are necessary to make a pound.

cones, sodium chloride, and a benzene boronic acid solution in benzene.

It is, therefore, an object of the invention to improve the operation of a bushing which is used to produce glass or other vitreous filaments.

Another object of the invention is to reduce the frequency of breakouts in bushing operation.

A further object of the invention is to apply a thin coating of one of certain materials to the surfaces of marbles which are to be remelted, in order to reduce the seeds and stones in molten glass produced from the marbles.

Other objects and advantages of the invention will be apparent from the following detailed description of a preferred embodiment thereof, reference being made to the accompanying drawings, in which.

Figure 1:
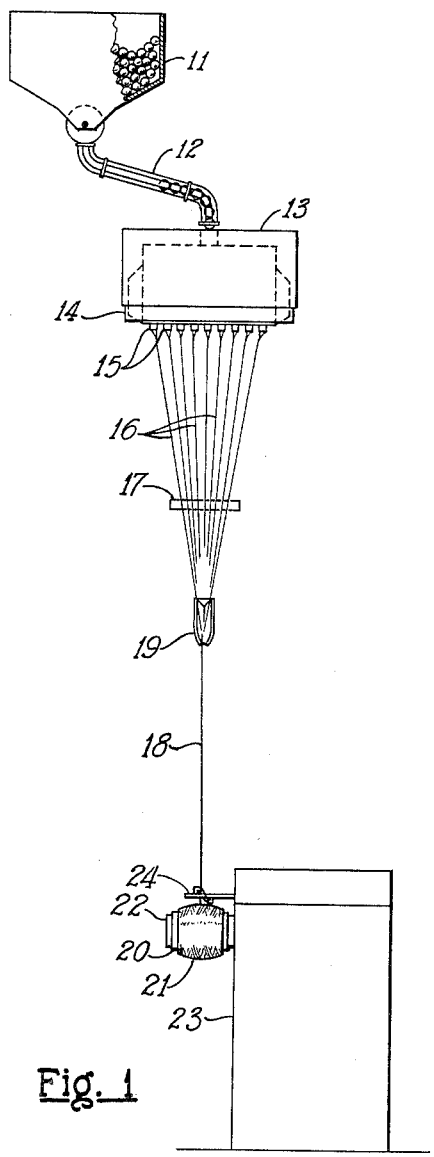
FIG. 1 is a view in elevation, with parts broken away to show details, of apparatus for melting glass marbles, flowing streams of the molten glass, attenuating the streams into filaments, gathering a plurality of the filaments into a strand, and winding the strand onto a forming tube.

FIG. 1 shows apparatus for forming continuous textile type strands and winding them into a package. The apparatus includes a hopper 11 to which marbles [2] about one inch or less in diameter and coated according to the invention are supplied. The marbles then feed down a chute 12 at a controlled rate into a bushing 13 of conventional design, and made of platinum with refractory insulation therearound. The platinum constitutes a resistance element which is heated by current from a suitable source to melt the marbles. At the bottom of the bushing 13 is a tip section 14 having a multiplicity of tips 15 in which orifices are drilled. Molten glass in the bushing 13 flows through the orifices of the tips 15 in streams which are attenuated into filaments 16. The filaments 16 contact a suitable applicator 17 which coats them with a suitable size, and the coated filaments are then gathered into a strand 18 by a shoe 19, and the strand is subsequently wound on a forming tube 20 into a package 21. The tube 20 is mounted on a suitably driven collet 22, which is journaled to a housing 23. A traverse 24 is used in connection with the winding of the strand 19 on the tube 20.

Whenever a breakout occurs at one of the tips 15, for example because of a stone or seed in the bushing 13, an operator must pull glass from that tip downwardly across the applicator 17 and the gathering shoe 19, and wrap the strand 18 around an empty forming tube 20. The broken ends of a filament within a strand cannot be joined, so a partially filled tube 20 on the collet 22 when a breakout occurs must be replaced by an empty tube and the operation resumed to produce a new package.

Using marbles which have been coated, in accordance with the invention, the frequency of breakouts has been substantially reduced. For example, the calldown rate for one bushing increased from 20% to 84%, as previously discussed, when uncoated marbles were replaced with marbles coated with a solution of boric acid. Stated another way, the average weight of the strand package produced increased from 2.54 to 4.05 pounds when the coated marbles were used in place of the uncoated ones.

A successful boric acid coating solution for use according to the invention has been made by combining 37.5 pounds of boric acid with 15 gallons of water at a temperature of 160–170° F., with agitation. This amount of boric acid is considerably more than can be dissolved in the water at this temperature, with the result that many particles of boric acid remain in suspension in the water and produce the appearance of a thin slurry. Saturated solutions of sodium fluoride, sodium silico fluoride, borax, and ammonium acetate have also been employed to coat marbles, as well as solutions or dispersions of phenol formaldehyde resoles of from 15 to 50 percent by weight resin solids; in all cases bushing operation was improved, or the previously described crucible melting test indicated that seeds and stones had been decreased, or both.

Figure 6:
FIG. 6 is a view in perspective of a pipe used with the above apparatus for distributing a coating solution.
Figure 2:
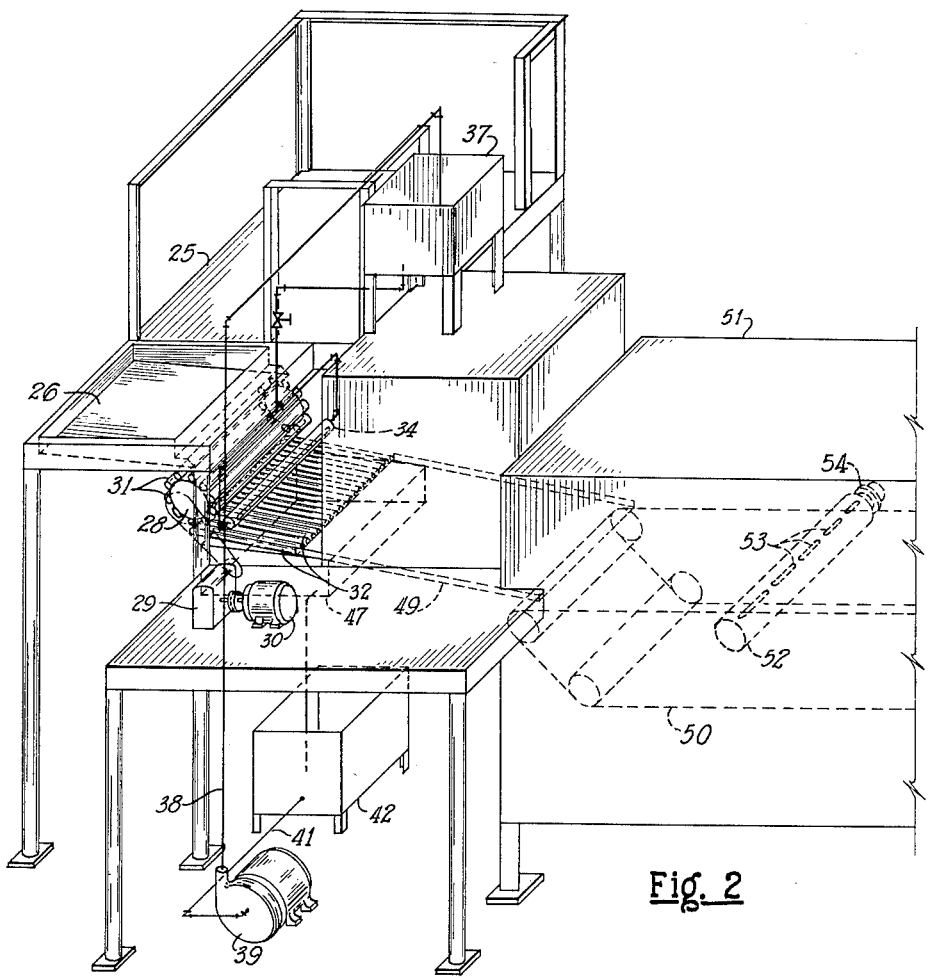
FIG. 2 is a front view in perspective of apparatus for applying a coating material to glass marbles and drying the resulting coating.
Figure 3:
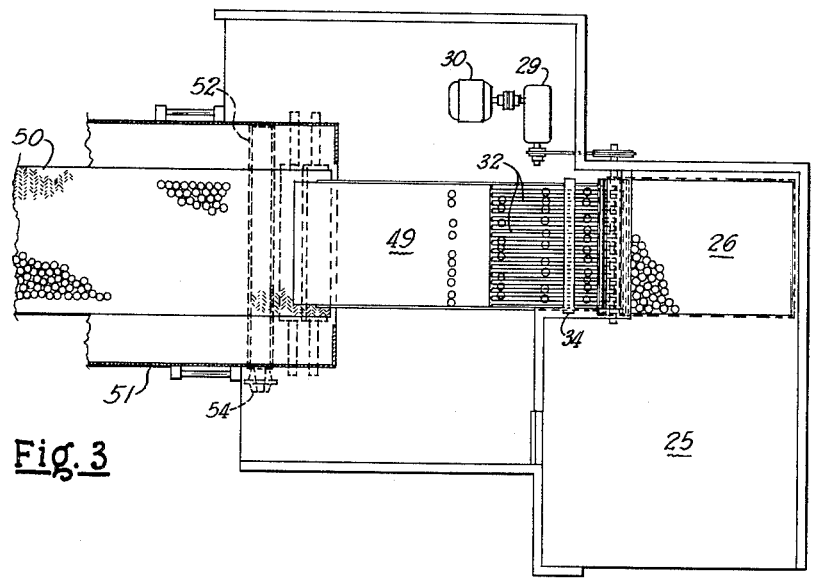
FIG. 3 is a plan view of the apparatus of FIG. 2 with a portion shown in cross section and with some parts not shown for the sake of clarity.
Figure 4:
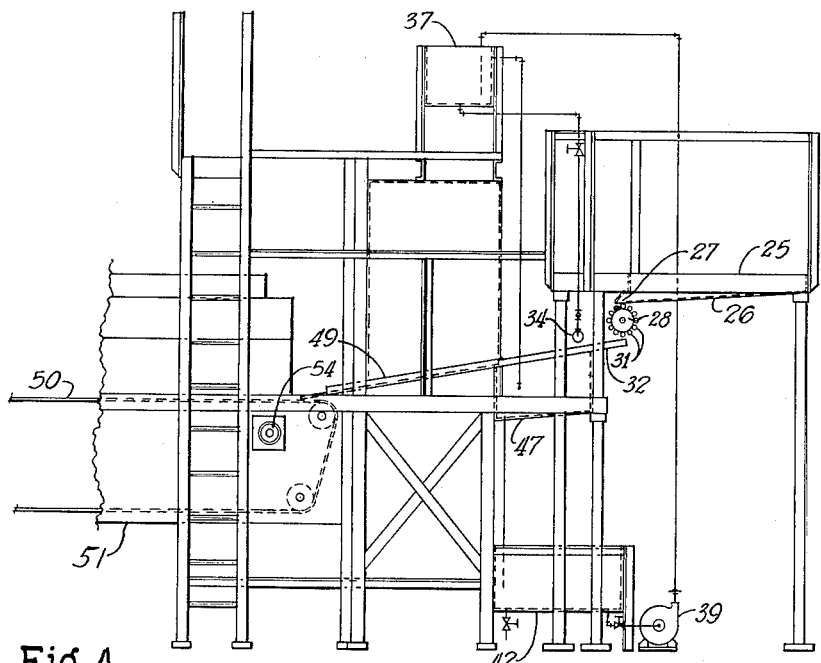
FIG. 4 is a rear view in elevation of the apparatus of FIG. 2.

While marbles can be coated in a number of different ways, as by dipping, spraying, brushing, or wiping, and with many devices, one convenient type of apparatus for coating large numbers of marbles is illustrated in FIGS. 2–4. This apparatus includes a platform 25 on which the marbles to be coated are placed and from which they roll into a hopper 26. From here, the marbles feed through a slot 27 (FIG. 4) at the lower end of the hopper onto a roller 28 driven by drive mechanism 29 and a motor 30 (FIG. 2). The roller 28 has a plurality of divider bars 31 spaced longitudinally around its circumference, so that the marbles are picked up in rows and dropped into a plurality of parallel grooves formed between spaced pipes 32. The marbles roll down the pipes, which are inclined at an angle of about 10° to the horizontal, and are thoroughly wet by a solution of a coating material according to the invention which flows from a slot 33 in a distributor tube 34 (see FIG. 6).

Figure 5:
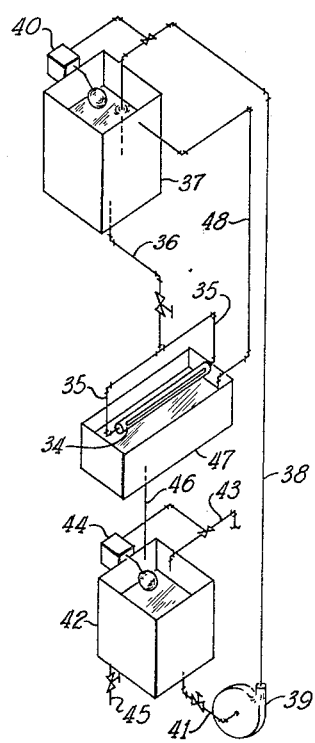
FIG. 5 is a somewhat schematic view in perspective of the apparatus of FIGS. 2–4, and shows, in particular, the flow of marbles and of coating material.

Referring more particularly to FIG. 5, a solution of coating material according to the invention is introduced into the interior of the tube 34, through supply lines 35, one of which is operatively associated with each end of the tube 34, and a line 36, from a surge tank 37. The solution is supplied to the tank 37 from a line 38 connected to the outlet end of a pump 39, the rate being controlled by a level control 40 in the tank 37. The inlet side of the pump 39 is connected by a line 41 to a mixing tank 42 in which the coating material is mixed with liquid supplied through a line 43, the flow being controlled by a level control 44. A drain line 45 is located in the bottom of the tank 42. Excess coating solution is returned to the tank 42 through a line 46 connected to a catch basin 47 located below the distributing tube 34 and the pipes 32. Any overflow from the surge tank 37 is also fed back to the basin 47 through a line 48, or can be fed directly back to the mixing tank 42, if desired.

Referring again to FIGS. 2–4, wet, coated marbles roll down a trough 49 and onto a mesh conveyor belt 50 in a lehr 51. At least one heater tube 52 (FIG. 3) is located below the upper run of the belt 50. Slots 53, directed upwardly toward the upper run of the belt 50, are provided in the tube or tubes 52. A burner 54 fires into one end of each tube 52 so that hot products of combustion are directed upwardly through the slots 53 to dry the coating on the marbles. The dried marbles, which have a coating about 0.001 inch thick on their surfaces, are discharged from the end of the lehr into a suitable container (not shown) and are subsequently dumped into the marble hopper 11 of the apparatus of FIG. 1. In general, the coating on marbles according to the invention should be from about 0.0005 inch to about 0.005 inch in thickness.

It will be appreciated from the foregoing detailed discussion that the application of a coating, in accordance

---

[2] The marbles can be made in a conventional marble machine in which glass batch or cullet is melted and from which gobs or slugs of molten glass are subsequently removed. These gobs or slugs drop down to the bite of two rotating rollers and are moved longitudinally of the rollers by helical grooves therein, being rolled into spherical form.

with the invention, to glass marbles, and use of the coated marbles in the process discussed above in connection with FIG. 1, greatly facilitates the production of filaments, and particularly the production of continuous filaments. All of the coating materials which have been found to be effective have a community of properties: they all increase the hydroxyl content of the marbles, as measured by infra-red absorbence. However, other coating materials which likewise raise the hydroxyl content of the glass have been found to be ineffective with respect to the fiber forming process.

The minimum amount of a coating material that should be applied depends upon the specific identity of the coating material used. As has been indicated above, the coating should range from about 0.0005 inch to about 0.005 inch in thickness in most instances; in any case, the amount of the coating must be sufficient to facilitate melting of the marbles. Most of the coating compositions that have been proved effective, as discussed above, are capable of changing the chemical composition of the glass. For example, boric acid, which constitutes the best presently known coating material, can introduce $B_2O_3$ into the glass. The chemical composition of a glass used in the production of filaments is critical, and comparatively slight changes with respect to proportions of certain constitutents will necessitate comparatively extreme compensating changes in process variables in the filament forming operation. When the coating material is one which is capable of changing the chemical composition of the glass, therefore, the maximum amount thereof which can be used is an amount just below that which would appreciable change the chemical composition, or change the chemical composition sufficiently that compensating changes would be required in the fiber forming process.

A phenolic resole suitable for use in coating marbles in accordance with the invention can be produced from 66.6 parts of formaldehyde (as 37 percent formalin), 100 parts of phenol and 4 parts of sodium hydroxide. The starting materials are mixed in a suitable vessel, allowed to stand at room temperature (about 25° C.) for approximately 16 hours, and heated at a progressively increasing temperature sufficient to maintain gentle boiling thereof. Heating is discontinued when the temperature of the reaction mixture reaches approximately 85° C. The sodium hydroxide in the reaction mixture is then neutralized with hydrochloric acid, and the neutralized resin is used as produced at a resin solids content of slightly less than 50 percent by weight or it can be subjected to a vacuum distillation to remove water, or water can be added, to achieve a desired solids content.

Practicing the instant invention using the previously identified boric acid slurry, and in the manner discussed above in connection with the attached drawings, constitutes the best presently known mode.

In its essential details, the invention provides an improvement in a method for producing glass filaments, which method includes the steps of charging a bushing with marbles of glass of a desired composition, heating the marbles in the bushing to provide a glass melt, flowing streams of the glass through orifices in the bushing, and attenuating the streams into filaments. The improvement comprises coating the marbles with a material selected from the group consisting of boric acid, borax, sodium fluoride, sodium silico-fluoride, phenol formaldehyde and ammonium acetate, and drying the coating on the marbles, prior to charging of a bushing therewith.

I claim:

1. In a method for producing glass filaments which includes the steps of heating glass structures to provide a glass melt and attenuating the glass melt into filaments, the improvement comprising coating vitrified glass structures with a material capable of exerting a fluxing effect upon the revitrification of said vitrified structures, prior to melting the glass structures.

2. A method as described in claim 1 in which said vitrified glass structures are spheres.

3. A method as described in claim 1 in which said material capable of exerting a fluxing effect is selected from the group consisting of boric acid, borax, sodium fluoride, sodium silico fluoride, phenol formaldehyde condensate and ammonium acetate.

4. A method for producing glass filaments comprising coating vitrified glass structures with a material capable of exerting a fluxing effect upon the revitrification of said vitrified glass structures, charging a bushing with the coated glass structures, heating said coated glass structures in the bushing to provide a glass melt, flowing streams of the glass melt through orifices in the bushing and attenuating the streams into filaments.

5. A method as described in claim 4 in which said vitrified glass structures are spheres.

6. A method as described in claim 4 in which said material capable of exerting a fluxing effect is selected from the group consisting of boric acid, borax, sodium fluoride, sodium silico fluoride, phenol formaldehyde condensate and ammonium acetate.

7. In a method for producing glass filaments which includes the steps of charging a bushing with vitrified glass structures of a desired composition, heating the structures in the bushing to provide a glass melt, flowing streams of the glass through orifices in the bushing, and attenuating the streams into filaments, the improvement comprising coating the structures with a solution of boric acid with excess undissolved boric acid suspended in the solution, and drying the coating on the structures, prior to charging of a bushing therewith.

8. In a method for producing glass filaments which includes the steps of charging a bushing with vitrified glass structures of a desired composition, heating the structures in the bushing to provide a glass melt, flowing streams of the glass through orifices in the bushing, and attenuating the streams into filaments, the improvement comprising coating the structures with a solution of borax, and drying the coating on the structures, prior to charging of a bushing therewith.

9. In a method for producing glass filaments which includes the steps of charging a bushing with vitrified glass structures of a desired composition, heating the structures in the bushing to provide a glass melt, flowing streams of the glass through orifices in the bushing, and attenuating the streams into filaments, the improvement comprising coating the structures with a solution of sodium fluoride, and drying the coating on the structures, prior to charging of a bushing therewith.

10. In a method for producing glass filaments which includes the steps of charging a bushing with vitrified glass structures of a desired composition; heating the structures in the bushing to provide a glass melt, flowing streams of the glass through orifices in the bushing, and attenuating the streams into filaments, the improvement comprising coating the structures with a solution of sodium silico fluoride, and drying the coating on the structures, prior to charging of a bushing therewith.

References Cited in the file of this patent

UNITED STATES PATENTS

| | | |
|---|---|---|
| 2,207,656 | Cartwright et al. | July 9, 1940 |
| 2,315,259 | Hyde | Mar. 30, 1943 |
| 2,354,350 | Schuetz | July 25, 1944 |
| 2,482,071 | Simison | Sept. 13, 1949 |
| 2,578,110 | Tooley | Dec. 11, 1951 |
| 2,635,389 | Toulmin | Apr. 21, 1953 |
| 2,699,415 | Nachtman | Jan. 11, 1955 |
| 2,833,673 | Hart et al. | May 6, 1958 |
| 2,860,450 | Case | Nov. 18, 1958 |